United States Patent [19]

McDowell

[11] Patent Number: 5,073,054

[45] Date of Patent: Dec. 17, 1991

[54] ELECTRONIC DICTIONARY WITH VERTICAL KEYBOARD

[76] Inventor: W. Stuart McDowell, 235 W. 76th St. - Suite 12A, New York, N.Y. 10023

[21] Appl. No.: 572,006

[22] Filed: Aug. 23, 1990

[51] Int. Cl.$^5$ .............................................. B41J 5/10
[52] U.S. Cl. ..................................... 400/486; 400/88; 364/920.4; 364/709.12
[58] Field of Search ................. 400/88, 485, 486, 489; 364/709.12, 920.4; 341/20, 22, 23

[56] References Cited

U.S. PATENT DOCUMENTS

| | | | |
|---|---|---|---|
| 911,842 | 2/1909 | Rollefson | 400/486 |
| 3,847,263 | 11/1974 | X | 400/486 |
| 3,929,216 | 12/1975 | Einbinder | 400/486 |
| 3,940,758 | 2/1976 | Margolin | 400/88 |
| 4,180,337 | 12/1979 | Otey | 400/486 |
| 4,211,407 | 7/1980 | Montgomery | 400/486 |
| 4,244,659 | 1/1981 | Malt | 400/486 |
| 4,324,976 | 4/1982 | Lapeyre | 400/88 |
| 4,332,493 | 6/1982 | Einbinder | 400/484 |
| 4,579,470 | 4/1986 | Casey | 400/489 |
| 4,635,219 | 1/1987 | Howard | 400/88 |
| 4,737,040 | 4/1988 | Moon | 400/110 |
| 4,824,268 | 4/1989 | Diernisse | 400/486 |

Primary Examiner—David A. Wiecking
Assistant Examiner—Steven S. Kelley
Attorney, Agent, or Firm—Eliot S. Gerber

[57] ABSTRACT

An electronic dictionary or language translator is in the form of a thin electronic device, preferably at least 3"×6" in size so that it may be placed in a book and used during reading. The electronic device has a relatively large display area and its keys are spread apart so that they may be readily operated by the fingers of either hand. The device utilizes a specially arranged keyboard with an alphabetical sequence of the letters, but with the vowels positioned so that they start and end each row. In addition, certain vowels are repeated both on the left and right sides of the keyboard.

8 Claims, 4 Drawing Sheets

ELECTRONIC DICTIONARY WITH VERTICAL KEYBOARD

FIELD OF THE INVENTION

The present invention relates to electronic dictionaries and language translators and more particularly to a novel keyboard for such devices.

BACKGROUND OF THE INVENTION

At the present time a number of electronic dictionaries and language translators are commercially available. Generally, electronic dictionaries are the size of a book and intended to sit on a desk. Some language translators are also book-like in size, although others are small enough to fit in a pocket or purse. The keyboards are generally the same as a typewriter keyboard with the arrangement of keys called a "QWERTY" keyboard.

That keyboard arrangement is adapted to be typed upon using both hands. However, if the keyboard is small, as in a pocket device, it is often typed upon using only one hand with a "hunt and peck" method. Because such small keyboards are typed upon using only one hand, they sometimes have a straight A to Z keyboard arrangement.

Users are not in the habit of typing with one hand and often find that their typing of words is slow, cumbersome and prone to errors.

In U.S Pat. No. 911,842 to Rollefson, entitled "Typewriting Machine", patented 1909, a typewriter keyboard is shown in which the central keys are arranged in four horizontal rows. The layout of the horizontal rows is the "common keyboard", i.e., the "QWERTY" keyboard, which are all the letters of the alphabet, including the vowels. In addition, there are fourteen special keys, seven of which are arranged on each the left and right sides of the regular keyboard. These special keys are the vowels and a space key.

Objectives of the Invention

It is an objective of the present invention to provide an electronic dictionary or language translator, which has a specially arranged keyboard so that it may be used for typing using one hand and is equally convenient for left handed or right handed users.

It is a further objective of the present invention that the keyboard be arranged so that the most commonly used letters (the vowels) are conveniently available.

It is a still further objective of the present invention to provide such a device which is sufficiently thin, for example, ⅛" or less, so that it may be used as a bookmark in a book and has a keyboard which is sufficiently large in size, at least 2"×2", so that its keys may readily be operated by the fingers of one hand.

It is a further objective of the present invention to provide an electronic dictionary, which has a large number of word entries, preferably over 100,000 and which has a sufficiently large visual display area so that a definition may be 10 words in length (80 characters) and the entire definition may be shown on the display.

BRIEF DESCRIPTION OF THE DRAWINGS

Other objectives and features of the present invention will be apparent from the following detailed description taken in conjunction with the accompanying drawings.

In the drawings.

DETAILED DESCRIPTION OF THE INVENTION

The present invention relates to an electronic dictionary or an electronic language translator. The dictionary preferably has at least 100,000 entries with each entry being a word and its definition. In the embodiment of a language translator the device has at least 25,000 words in each language. For example, it would have 25,000 words in English and the corresponding literal translation in French so that each language may be used as the entry language. The language translator is an English to French translator and at the same time, a French to English translator.

Figure 1:
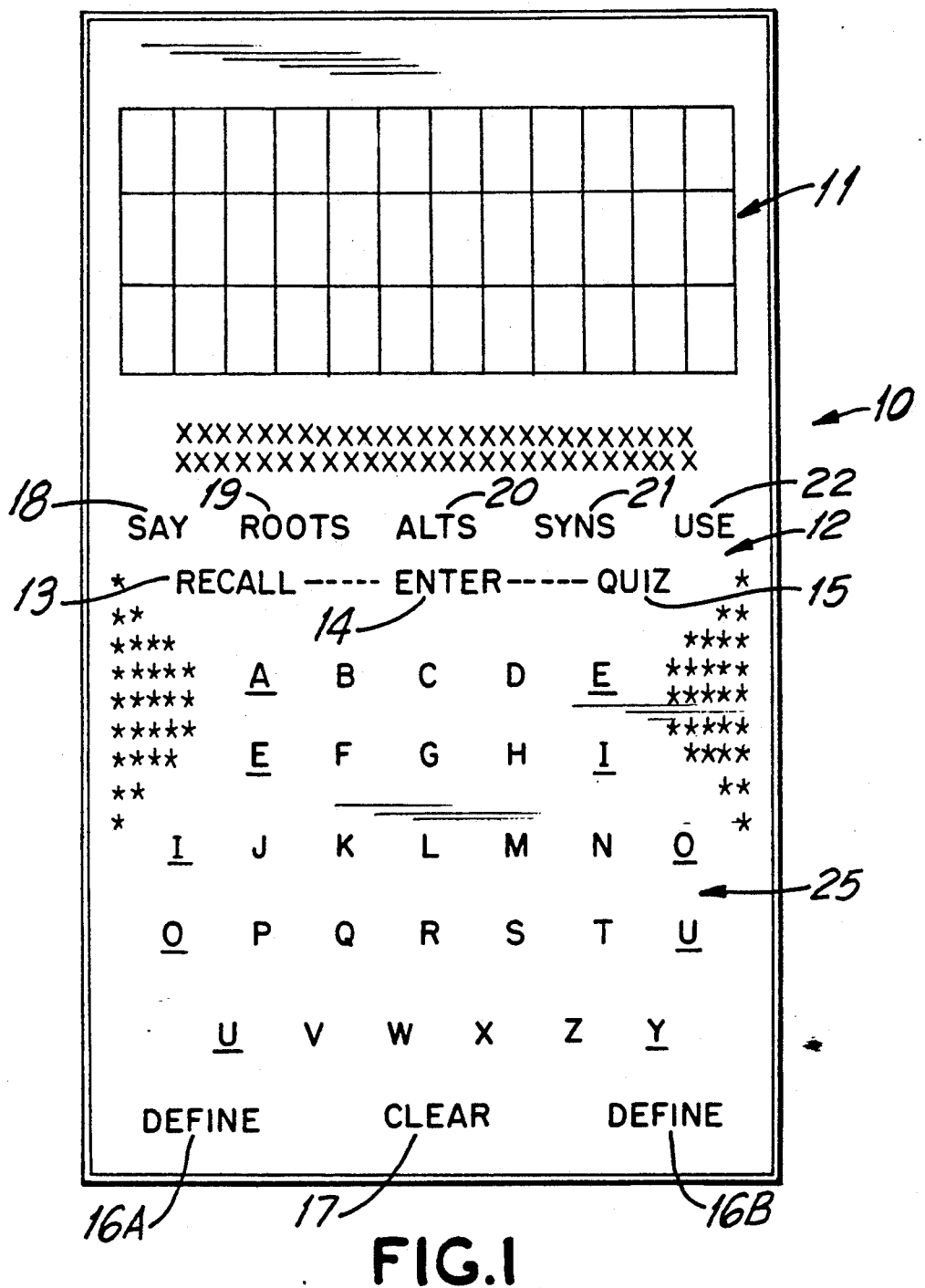
FIG. 1 is a top plane view of the electronic dictionary of the present invention.

As shown in FIG. 1, the electronic device 10 is a semi-flexible thin member. Preferably the device is no thicker than a conventional plastic credit card and is less than ⅛th of an inch in thickness. The device 10 has a display 11. Preferably, the display is an LCD (liquid crystal display). The display 11 is substantially large in size, preferably at least 3" wide and 1.5"high, so that it may display 10 words at the same time. Preferably it is a 4-line 24 character dot matrix LCD display.

Keyboard 12 is positioned beneath the display level. The keyboard has three basic keys entitled Recall 13, Enter 14 and Quiz 15. The phase of the Recall button 13 is to show the last definition that was requested. The purpose of the Enter key 14 is to place the device in the Enter mode in which the word to be defined is typed on the keyboard. The Quiz button 15 provides a word quiz i.e., a type of word game.

In addition, a series of special purpose buttons are positioned as part of the Keyboard 12. These special purpose buttons include the Define buttons 16A and 16B, both of which are used to obtain the definition of the word entered on the keyboard. The Clear button 17 is operated to clear the display 11 and prepare for the next word which is entered on Keyboard 12.

In addition, a series of buttons are used to obtain from memory other functions of a dictionary. The Say button 18 obtains a saying which illustrates the use of the word entered in the keyboard. The Roots button 19 provides the language root of that word. The ALTS button 21 obtains alternate uses of the word in sentences. A Synonyms button 21 obtains synonyms for the word and the Use button 22 obtains a sample sentence or phrase in which the word is used.

The alphabetical keys of the keyboard are arranged in five rows. The first row (top row) has keys for the letters a, b, c, d and e. The second row has keys for the letters e through i. The third row has keys for the letters i through o. The fourth row has keys for the letters o through u and the fifth (bottom row) has keys for the letters u through y. The letter z is before the letter y, i.e., they are transposed. The letter Q is Qu, i.e., it automatically inserts the letter u after the Q.

In the arrangement of the keys, shown in FIG. 1, the vowels a, e, i, o, u are on the left side of the keys and the vowels e, i, o, u and y are on the right side. In addition, the vowels e, i and o are repeated on both the left and right side.

The layout of the keyboard and its relatively wide spacing of the alphabetical keys are adapted for one-handed operation. The keyboard may be used with equal ease by left handed or right handed persons.

The electronic device 10, due to its size, may be used as a bookmark in a book and may be kept in the book while the user is reading. For example, as the reader comes across a word with which he is not familiar and wants to obtain its definition, he need only flip the pages of the book to the place where the electronic device 10 has been placed and operate its keyboard with his free hand. The definition of the word he seeks is obtained by operating the keys 14, spelling the word using the alphabetical keys 25 and then pushing the definition button 16A. The definition of the word will appear in the display 11.

In the embodiment of an electronic dictionary the dictionary (lexicon) contains preferably 100,000 words and their definitions. In addition, there is preferably displayed the grammatical classification, syllable breaks, and other forms of the word (adjective, noun, verb, adverb). In addition, the dictionary may use a phonetic spelling and a key marked "SPELL" (not shown) to obtain the correct spelling, using an internal look-up-table (LUT) which is part of the ROM.

In the embodiment of a language translator, the device may be used to translate from one language to another, for example French to English and also, using the same device, English to French.

In this embodiment the memory (ROM) contains at least 50,000 words.

Alternatively, a language translation device may be used for five or more languages and have 10,000 words. For example, it may translate from English into French, Spanish, German and Italian. The device has keys for each language. One types a word in English, for "YES", operates the language selection key, for example "FR" (French) and its translation "OUI" appears on the display.

Figure 3:
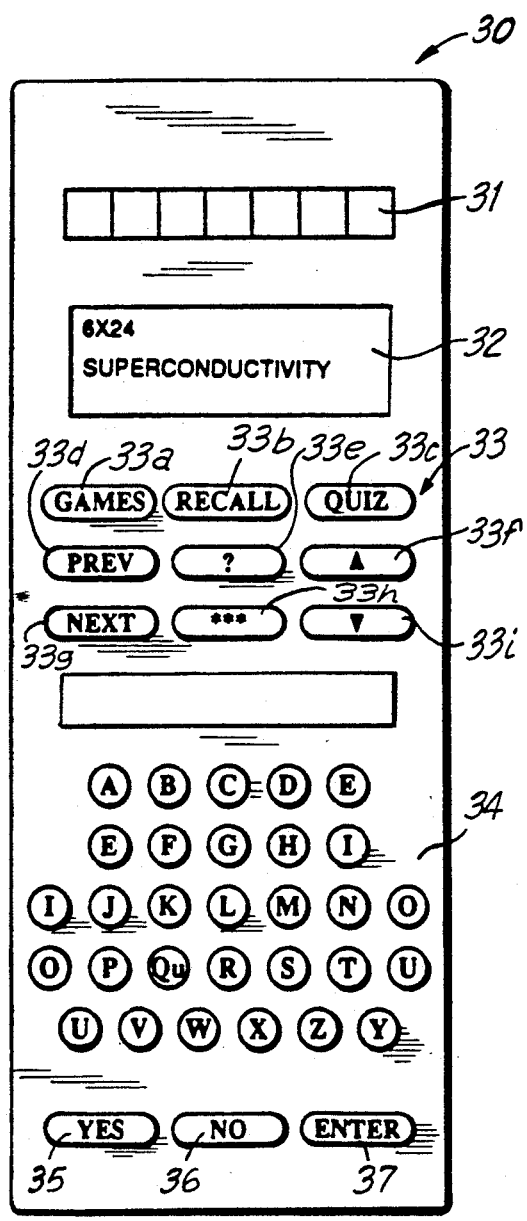
FIGS. 3-6 are front plane views of alternative designs of electronic dictionaries, within the present invention.

As shown in FIGS. 3 through 6, the front face of the electronic dictionary of the present invention may take various designs. Its size may be, for example in device 10, 4×7 inches or, in other devices about 3×6 inches. As shown in FIG. 3, the electronic dictionary device 30 includes a solar cell 31. The solar cell 31 is of a sufficient size and energy output so that under normal room lighting conditions, it will provide sufficient electricity to power the device. The device 30 has a "6×24" LCD display panel 32 which provides 24 characters on each line and 6 lines, for a total of 144 characters. With an average word length of 7 words, this is sufficient for about 20 words.

The front face of the device 30 includes a series of special function keys 33 which may be operated by the user. These keys include a Games key 33a, which is used to display games from the memory of the device; a Recall button 33b which recalls the last 10-20 words asked to be defined; a Quiz button 33c, which is a particular type of game in which the user is quizzed as to the definition of words; a Previous button 33d which recalls the immediately previous definition; a Question mark button 33e; and a single space "wild card" button which provides a single blank space. The wild card button is used to denote an undefined single space, for example to check spelling or to find a word in a cross-word puzzle. In addition, the special function keys 33 include an arrow upward scroll button 33f which scrolls the display upwardly; a Next button 33g which brings the next definition from memory; an Asterisk button 33h, which is a multiple space "wild card" which denotes two or more undefined spaces; and an arrow downward scroll button 33i, which scrolls the display downwardly.

Figure 2:
FIG. 2 is a front plan view of the electronic dictionary shown in FIG. 1.

The alphabetical keyboard 34 of the present invention is positioned beneath the special-purpose keys 33. The keyboard 34, is explained in the embodiment of FIG. 1 and 2 and is used in the other embodiments of FIGS. 3 through 6. It is arranged with the vowels on the left and right sides of the alphabetical keyboard 34 and with certain of the vowels repeated on both sides. In addition, the device 30 includes a "Yes" button 35 which is used in the games, a "No" button 36 which is also used in games, and an "Enter" button 37 which is operated by the user to enter the word he has typed and which is to be defined.

Figure 4:
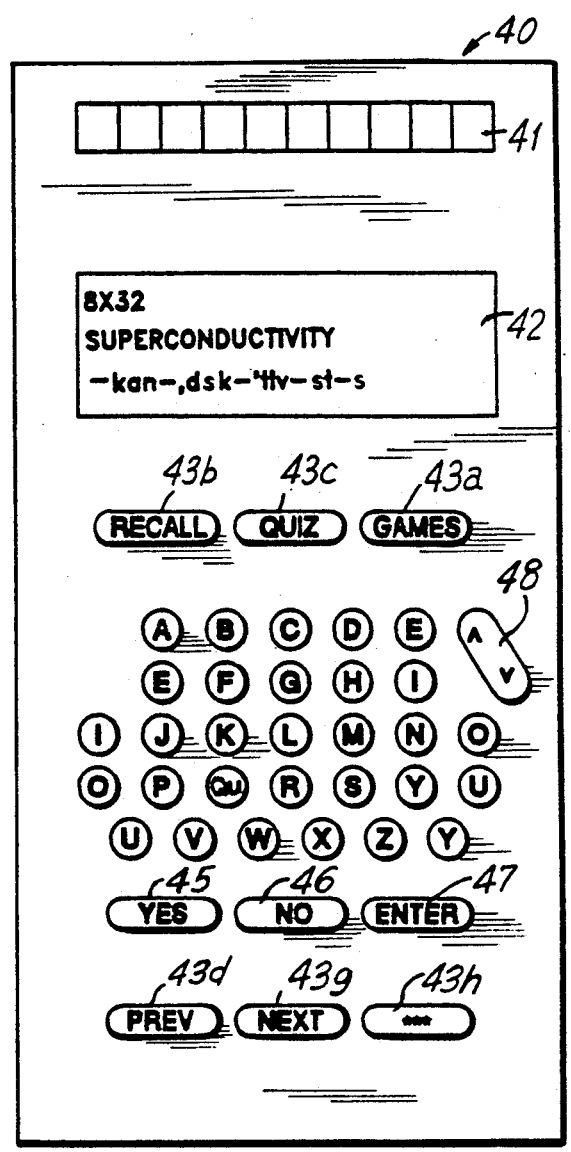
Figures 5, 6:
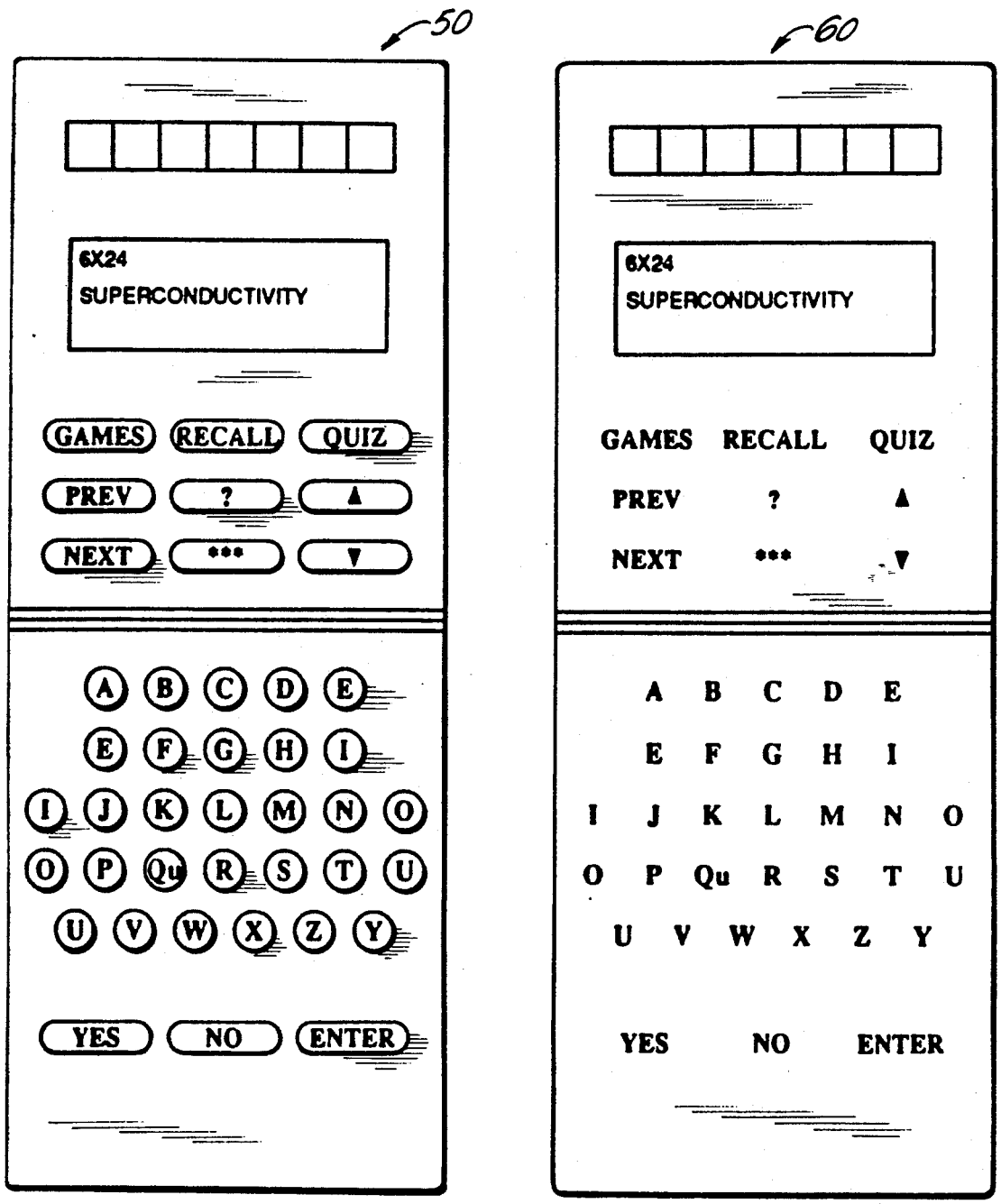

The devices of FIGS. 4 through 6 are similar in many respects to the device of FIG. 3. Consequently, only the alterations or changes from the device 30 will be noted in the description se forth below.

In the device 40 of FIG. 4, the solar cell 41 powers the device, which has an 8×32 character display 42. The device has special buttons for Recall 43b, quiz 43c, Games 43a, Prev (previous) 43d, Next 43g, and asterisk 43h, all of whose functions are the same as the corresponding buttons in the device 30. In addition, it has a "Yes" button 45, a "No" button 46 and an "Enter" button 47. The downward and upward scrolling of the display on display 42 is controlled by the toggle-type switch 48.

In the device 50 of FIG. 5 and the device 60 of FIG. 6 the appearance and/or position of the keys are different from the keys of the device 30; but the function of the keys is the same.

In the device 60 of FIG. 6 the buttons are not formed, as in the previous embodiments, as separate operable buttons, but rather are touch-sensitive areas on a pad.

Figure 7:
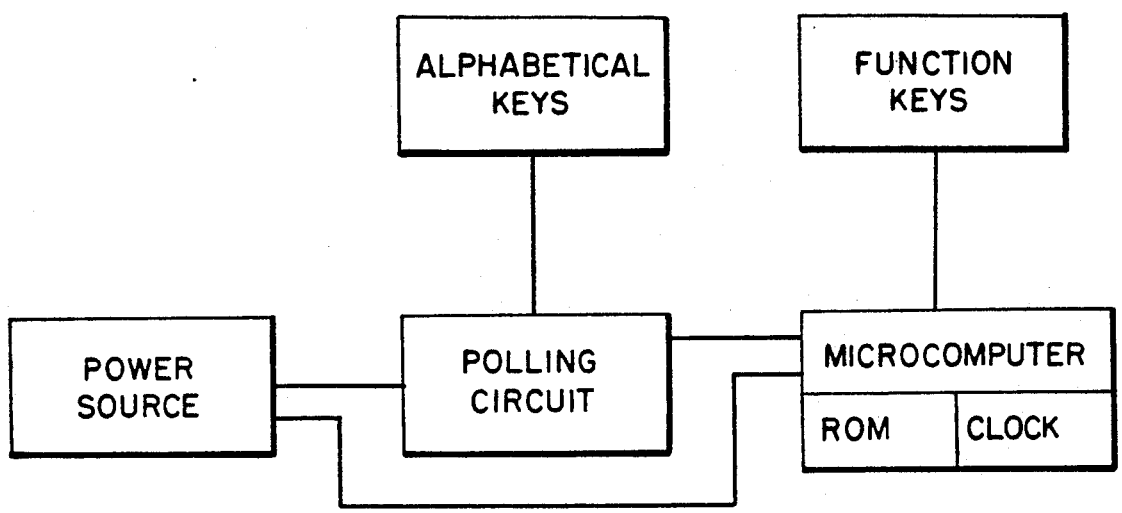
FIG. 7 is a block circuit diagram of a suitable circuit for the devices of the present invention.

As shown in FIG. 7, a suitable circuit 70 for the devices of the present invention includes a power source 71, which preferably is a solar cell (devices 30, 40, 50 and 60) or a battery (device 10). The keys 72 (buttons) close contact or touch sensitive (capacitance) switches. The alphabetical keys 72 are connected to a polling circuit 73, which polls the open-closed status of each key on a timed basis controlled by the internal clock 74 of the microcomputer 75. The microcomputer 75 and its ROM (read-only memory) 76 are preferable integrated circuits (chips) and the ROM 76 may have a capacity of about 0.5 to 2 million bytes with its data in the form of a series of look-up tables (LUT). The housing of the device is preferably a washable and sturdy plastic such as Delrin (TM) or nylon.

I claim:

1. An electronic device adapted to be typed upon using either hand and to be used as a bookmark, comprising;
    (a) a housing having a front face of at least 2×3 inches and a thickness of ⅛ inch or less;
    (b) a keyboard having a plurality of rows of keys, each row having a left and right edge, the keys in each row being in substantial alphabetical order; wherein vowels correspond to the keys at each of said edges; the vowels at the left edge of each row are in alphabetical order and the vowels at the right edge of each row except the last row, are the same as the vowels at the left edge of the next row;

(c) a power source within the housing
(d) a microprocessor within the housing connected to said power source and keyboard and having a digital data memory.

2. An electronic device as in claim 1 wherein said keyboard has at least three of said vowels repeated both on said left and right edges.

3. An electronic device as in claim 2 wherein the first row of letters consists of the letters A, B, C, D, E, the second row consists of the letters E, F, G, H, I, the third row consists of the letters I, J, K, L, M, N, O, the fourth row consists of the letters O, P, Q, R, S, T, U and the fifth row consists of the letters U, V, W, X, Z, Y.

4. An electronic device as in claim 1 which is an electronic dictionary and said memory contains the definitions of words.

5. An electronic device as in claim 1 which is a language translation device wherein said memory includes a look-up-table consisting of translation of words from one language to another.

6. An electronic device as in claim 1 wherein said memory is a ROM (read only memory).

7. An electronic device as in claim 1 wherein said power source is a solar cell.

8. An electronic device as in claim 1 wherein said power source is a battery.

* * * * *